June 6, 1967 C. DOMENIGHETTI 3,323,428
DEVICE FOR CONNECTING VIBRATORY MEMBER TO A FRAME
Original Filed Sept. 10, 1958
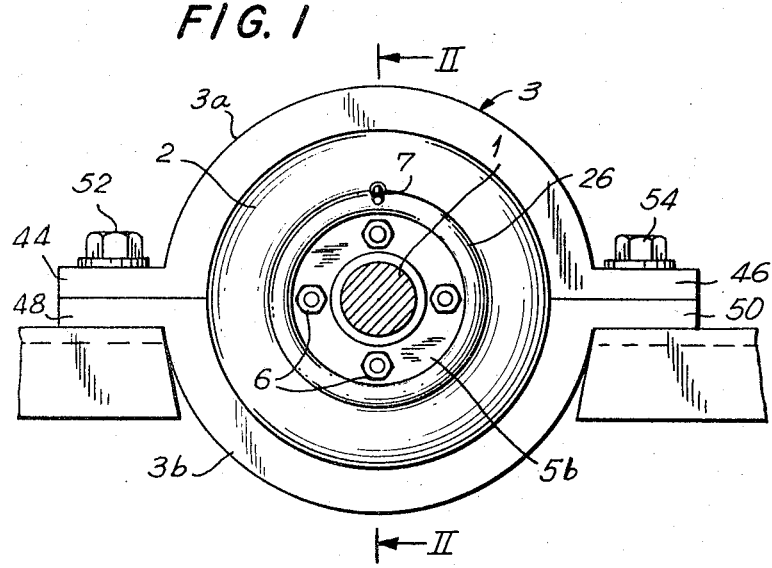
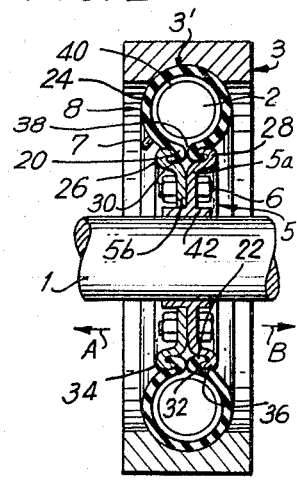
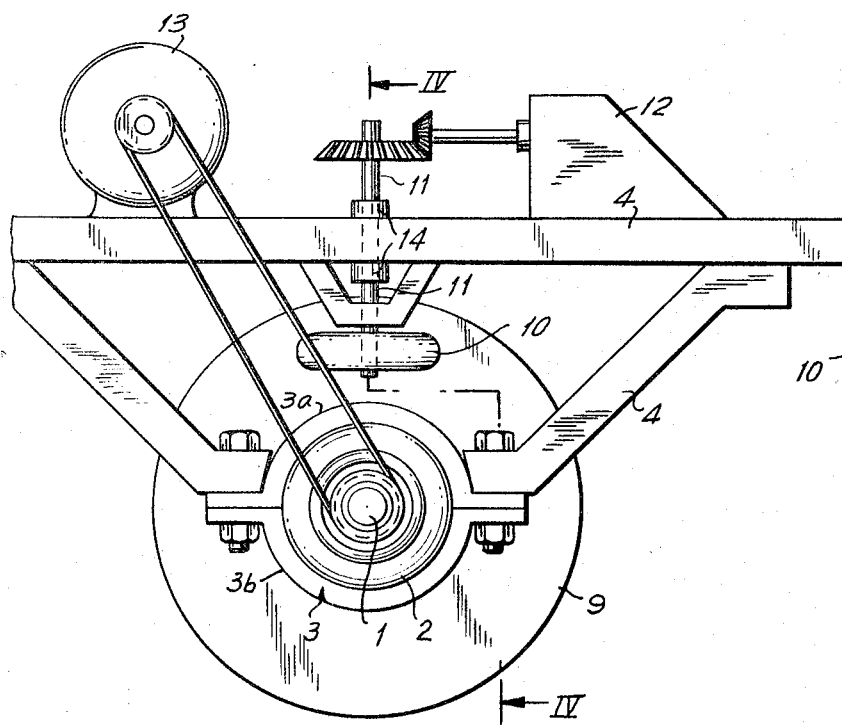
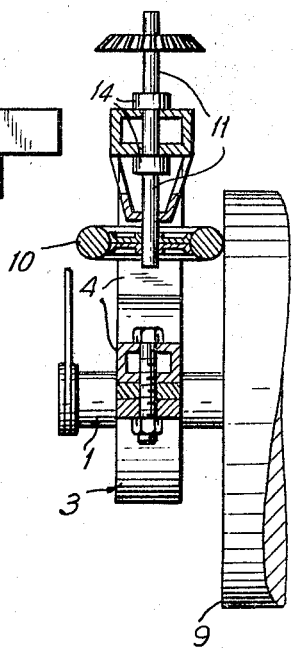

United States Patent Office 3,323,428
Patented June 6, 1967

3,323,428
DEVICE FOR CONNECTING VIBRATORY
MEMBER TO A FRAME
Constante Domenighetti, deceased, late of Via Nosetto 6,
Bellinzona, Switzerland, by Domenico Domenighetti,
Bellinzona, Switzerland, and Diana Domenighetti and
Dafne Domenighetti, both of Milan, Italy, Daria Wilhelm Domenighetti, Melide, Switzerland, and Delfine
Domenighetti in Fiammenghi, Milan, Italy
Continuation of application Ser. No. 760,102, Sept. 10,
1958. This application Mar. 28, 1966, Ser. No. 538,109
Claims priority, application Switzerland, Sept. 13, 1957,
50,517/57
9 Claims. (Cl. 94—50)

This invention relates to devices for preventing the transmission of vibrations from one component of a machine to another component therein, and in particular to devices for preventing the transmission of vibrations from the shaft of a vibrator to the support or frame thereof. This application is a continuation of applicant's prior and copending application Ser. No. 760,102 filed Sept. 10, 1958, and now U.S. Patent No. 3,283,678.

More particularly, the invention provides a device to keep the frame of a road roller of the vibrating type free from the vibrations generated by the shaft of its vibrating roller.

The invention is characterized in part by the use of a fluid cushion, preferably maintained under an adjustable pressure, which cushion is interposed between the vibrating component of a machine and the components thereof which are to be kept free from vibrations.

The device by which the above-stated technique is carried into practice may include a fluid cushion contained in a flexible casing and provided with a pressure adjustment valve, the cushion being shaped in such a manner as to cover the whole supporting surface between the vibrating component and the component which is to be kept free from vibrations.

In practice, since it is important to keep the frame of a road roller of the vibrating type free from vibrations which could be transmitted thereto by the shaft whereon the vibrating roller is fitted, means are provided in the form of a metal annular disc assembly secured at its bore to the vibrating shaft and having a pneumatic ring, provided with a pressure regulating valve, secured to its peripheral crown.

Two embodiments of the invention are diagrammatically shown in the accompanying drawing, wherein:

FIGURE 1 is a front view of a vibrating shaft mounted on a support by a damping cushion provided in accordance with the invention;

FIGURE 2 is a cross-sectional view taken along line II—II of FIG. 1, with the exclusion of said shaft;

FIGURE 3 is a side view of the roll of a vibrating road roller, provided with an auxiliary device for taking-up the axial stresses while damping at the same time the vibrations; and FIGURE 4 is a front view of the arrangement as shown in FIG. 3, with a sectional view of the auxiliary device.

As shown in the drawing, the frame or support 4 is supported on the vibrating shaft 1 which, for example, may be driven by a motor 13 (as seen in FIG. 3). Annular discs 5 are secured to the shaft 1 with the aid of connecting devices 6 and clampingly engage a pneumatic cushion 2 secured to the outer periphery of the discs 5 and provided with a valve 7 for the adjustment of internal pressure. The contact between said cushion and the frame 4 is established through a semi-circular shaped case 3, a portion of said pneumatic cushion being seated in the concave seat or recess 3' of said case.

By suitably adjusting the pressure of pneumatic cushion 2 with the aid of valve 7 within which cushion the compressed fluid (preferably air) is enclosed in a flexible hose or tube 8 having a uniform wall thickness, the possibility is provided to obtain a thoroughly uniform vibration damping in the whole machine, even when more than two dampers are fitted on the vibrating shaft 1. Tube 8 is constituted by a toroidal elastic hollow ring.

From the above it will be seen that the invention provides a device for connecting a vibratory member to a frame, while preventing the transmission of vibrations from the vibratory member to the frame. Generally it may be considered that this device comprises first and second concentric devices respectively connected to the member which may be, for example, the roller 9 as shown in FIG. 4, and to the frame which is constituted by the element 4. Such concentric devices are generally constituted by the shaft 1 and the case 3, as will be discussed in greater detail hereinunder. In addition the device provided in accordance with the invention may be generally considered as including a cushioning means constituted at least in part by the cushion 2 and the tube 8 which are generally in the form of a toroid positioned between and concentric with the elements 1 and 3.

It will now be noted that the tube 8 includes lateral edge portions 20 and 22, which extend generally in the direction of the shaft 1, and that between these lateral edge portions and integral with the same, is a tubular portion 24 which extends generally from the shaft 1 towards the case 3. It will further be noted that the seat or recess 3' is of a profile which is similar to or identical to that of the tubular portion of the tube 8. This means that there will be a full contacting surface therebetween, the recess 3' preferably being of a continuous form to accommodate said tubular portion therein.

The discs 5 constitute, at least in part, gripping means mounted on the shaft 1 to grip the lateral edge portions 20 and 22 of the tube 8. By this arrangement, axial as well as radial displacements of the tube are avoided.

More particularly, the gripping means constituted by the discs 5 include flanges 26 and 28 which are circular in the sense that they encircle and are concentric with the shaft 1. Said flanges 26 and 28 have U-shaped profiles and define grooves 30 and 32 which open directly towards one another and in which the lateral edge portions 20 and 22 of the tube 8 are positioned. Said grooves are preferably annular grooves extending continuously around the shaft 1.

Flanges 26 and 28 include upper extremities 34 and 36 which are directed towards one another and may be considered generally as lying on the surface of an imaginary cylinder encircling the shaft 1. Between extremities 34 and 36 is defined a radial opening 38, through which the lateral edge portions 20 and 22 of tube 8 extend into the grooves 30 and 32. The lateral edge portions 20 and 22 flare in opposite directions from the opening 38 into grooves 30 and 32 and thus provide a structure which is well suited for resisting axial forces to which the tube 8 is subjected.

In addition the opening 38, constituting the spacing between the extremities 34 and 36 of flanges 26 and 28, is of a size which is less than the combined thicknesses of the lateral edge portions 20 and 22 so that these edge portions are clamped pinched together by the upper extremities of the flanges to form a pneumatically tight chamber in the tube 8, which may be regarded as constituting the pneumatic cushion 2. If desired, the above structure may be supplemented by the use of an inner tube 40, this being at the option of the user, dependent upon the application to which the structure is to be put. However, the sealing relationship existing between the lateral edge portions 20 and 22 will in most circumstances be sufficient to provide a fluid-tight or pneumatically-tight chamber, as a result of which it is seen that the lateral edge portions of the tube 8 are grasped sufficiently firmly to prevent dislodgement of the tube 8.

The discs 5 which support the flanges 26 and 28, are more particularly constituted by two discs of preferably flat shape which are in face-to-face abutting relationship. These discs may be tightened together by connecting devices or bolts 6, which thereby constitute a means to adjust the strength with which the lateral edge portions of tube 8 are clamped. One of the discs 5, notably the disc 5a, is integral with and supported on a circular collar 42 which is concentric with and mounted on the shaft 1, the disc 5a constituting a radial extension from the collar 42 and further constituting a rigid support for the related flange 28. The other of the discs, notably disc 5b, encircles the collar 42, but is not attached thereto. It constitutes a rigid support for the flange 26.

The valve 7 constitutes a means to adjust pneumatic pressure within the fluid-tight chamber referred to hereinabove and by such means account may be taken in respect of the frequency and magnitude of the vibrations to which shaft 1 is subjected. The said valve may open directly into the chamber defined within the tube 8 or may be attached to the inner tube 40 if the latter is employed.

The case 3 comprises rigid metallic semi-circular members 3a and 3b which include diametrally disposed end portions 44 and 46 and 48 and 50 respectively. Bolts 52 and 54 constitute a means to connect said end portions and thereby the semi-circular members together, it being noted that the bolts 52 and 54 moreover connect these end portions to the frame 4. At the same time these bolts constitute a means for adjustably securing sections 3a and 3b together, whereby the force with which the tube 8 is gripped may be adjusted. It will also be noted that the end portions 44, 46, 48 and 50 define a diametral plane through which extends the shaft 1. By reason of this construction, there insures to the benefit of the invention the advantage that forces exerted in an axial direction through shaft 1 have no lever arm with which to pry the end portions apart and thus the structure is stronger than those heretofore employed.

In respect of the tube 8, this can be made of various conventional elastic, resilient or flexible materials such as rubber, natural or synthetic, it being understood that the lateral edge portions referred to hereinabove are integral with the main tubular portion 24 to constitute a hollow flexible body impervious to the pressure medium to be stored therein.

In cases where the extensions or shoulders are formed on the toroidal case or on the pneumatic cushion in FIGS. 1 and 2 are not sufficient to prevent positively any axial displacement, recourse can be made to an auxiliary device as shown in FIGS. 3 and 4. Such device is designed to have the pneumatic cushion 2 relieved from substantially all possible stress in a direction paralell to its axis.

Said auxiliary device might be fitted on either or on both sides of vibrating roller 9, which is mounted on the vibrating shaft 1. The auxiliary device essentially comprises a further pneumatic cushion 10, also of annular shape and fitted to frame 4 of the machine. Said pneumatic cushion 10 will damp also the vibrations in a transverse direction, which vibrations are produced in the roller 9 by an eccentric (not shown) fitted on the shaft 1. In case the vibrating roller 9, with its shaft 1 which is subjected to strong and quick vibrations, is to be connected with a frame, then the radial oscillations are damped in respect to frame 4 by the device as shown in the FIGS. 1 and 2, while the vibrations produced in a direction parallel to shaft 1 as well as all lateral shiftings caused by moving around a curve or by the irregular surface of a road whereon the machine rests, will in this case be taken-up and damped by the pneumatic cushions 10. Such cushions are fitted on a shaft 11 perpendicular to roller shaft 1 and rest against the side faces of roller 9 or against any other suitable place. Such cushions are preferably annularly shaped and are fitted loosely on their shafts. They will rotate at the same peripheral speed as the side faces of roller 9 against which they rest. The cushions 10, instead of being loosely fitted, might be driven by any known mechanical system such as motor 12 through suitable gearing, thereby driving the vibrating roller 9. Thus, cushion 10 might act at the same time both as driving and as damping elements. The shaft 11 can be displaced along its axis within bearings 14 to adjust the position of the cushion 10 with respect to roller 9.

The discs 5 can be rigidly secured to shaft 1 if no rotary motion is to be imparted to the shaft. If, instead, a rotary shaft is used (driven, for example, by motor 13), said discs are fitted thereon by means of a suitable bearing.

There will now be obvious to those skilled in the art many modifications and variations of the structure set forth above. These modifications and variations will not depart from the scope of the invention if defined by the following claims.

What is claimed is:

1. A device for connecting a vibratory member to a frame while preventing the transmission of vibrations from said vibratory member to said frame; said device comprising first and second concentric means respectively connected to said member and said frame, cushioning means in the form of a toroid between and concentric with said first and second means, said toroid including lateral edge portions of substantially uniform wall thickness extending generally towards one of said means and, between and connected to said edge portions, a tubular portion extending towards the other of said means, the latter said means being provided with an annular recess accommodating said tubular portion, and gripping means on said one means to grip said lateral edge portions to resist axial as well as radial displacements of said toroid, said gripping means including circular flanges defining annular grooves opening towards each other and in which said lateral edge portions are positioned, said flanges including extremities defining an opening through which the edge portions extend into said grooves, said edge portions flaring in opposite directions from said opening into said grooves, the extremities of said flanges being spaced apart at a distance which is less than the combined thicknesses of said edge portions extending therebetween whereby the edge portions are pinched together to form a pneumatically tight chamber in said tubular portion.

2. A device as claimed in claim 1, wherein said gripping means includes discs in face-to-face relation supporting respective of said flanges, and means for adjustably connecting said discs together whereby to provide adjustment of the force with which the said lateral edge portions are clamped.

3. A device as claimed in claim 2, comprising means to adjust pneumatic pressure in said chamber.

4. A device as claimed in claim 3, wherein said other means, which is provided with said recess, comprises rigid semi-circular members including diametrally disposed end portions in face-to-face relation, and means to adjustably connect the end portions and thereby the semi-circular members together, said one means on which said gripping means is mounted being a shaft disposed generally in the diametral plane of said end portions.

5. A device as claimed in claim 4, wherein one of said discs includes an axially extended circular collar mounted on said shaft and a radial extension on and integral with said collar to support the corresponding one of said flanges, the other of said discs encircling said circular collar and lying flatly against said one disc.

6. A device as claimed in claim 5, wherein the edge portions in the said flanges, generally define a cylinder encircling said shaft.

7. A device as claimed in claim 6, wherein the annular recess and tubular portion are of corresponding profiles whereby the tubular portion fits, substantially, exactly into said recess.

8. A device as claimed in claim 4, wherein the means connecting the end portions together connect the same to said support.

9. A device as claimed in claim 1, wherein the tubular and edge portions are integral parts of a flexible body.

References Cited

UNITED STATES PATENTS

| | | | |
|---|---|---|---|
| 1,035,424 | 8/1912 | Rice | 152—362 X |
| 1,389,024 | 8/1921 | Baldwin | 152—362 X |
| 1,458,532 | 6/1923 | Lanchester | 152—362 X |
| 2,000,196 | 5/1935 | Simmons | 267—35 |
| 2,259,942 | 10/1941 | Stroud | 308—184 X |
| 2,583,809 | 1/1952 | Bloechl | 152—362 X |

CHARLES E. O'CONNELL, *Primary Examiner.*

N. C. BYERS, *Assistant Examiner.*